United States Patent
Seger (10) Patent No.: US 9,333,679 B2
(45) Date of Patent: May 10, 2016

(54) MAGAZINE DEVICE FOR BLOW MOULDS, COMPRISING A CLEANING DEVICE

(75) Inventor: Martin Seger, Neumarkt i. d. Opf. (DE)

(73) Assignee: KRONES AG (DE)

( * ) Notice: Subject to any disclaimer, the term of this patent is extended or adjusted under 35 U.S.C. 154(b) by 429 days.

(21) Appl. No.: 12/877,839

(22) Filed: Sep. 8, 2010

(65) Prior Publication Data

US 2011/0061690 A1 Mar. 17, 2011

(30) Foreign Application Priority Data

Sep. 11, 2009 (DE) .................... 10 2009 040 978

(51) Int. Cl.
| | | |
|---|---|---|
| *B29C 33/72* | (2006.01) | |
| *B29C 31/00* | (2006.01) | |
| *B08B 3/02* | (2006.01) | |
| *B29C 49/42* | (2006.01) | |
| *B29C 49/48* | (2006.01) | |
| *B29C 49/46* | (2006.01) | |

(52) U.S. Cl.
CPC .................. *B29C 33/72* (2013.01); *B08B 3/024* (2013.01); *B29C 31/006* (2013.01); *B29C 49/42* (2013.01); *B29C 49/48* (2013.01); *B29C 2049/4694* (2013.01); *B29C 2049/4856* (2013.01)

(58) Field of Classification Search
CPC .................. B29C 2049/00; B29C 2049/4858; B29C 2049/4856; B29C 2033/72; B29C 31/006; B08B 7/00; B08B 3/024
USPC ................ 134/84, 137, 140, 142, 145, 104.1, 134/152–153; 211/13.1, 1.52, 1.55; 15/3.2, 15/68, 88.1–88.2
See application file for complete search history.

(56) References Cited

U.S. PATENT DOCUMENTS

| | | | | |
|---|---|---|---|---|
| 3,059,305 A | * | 10/1962 | Brozdowicz | 425/226 |
| 3,941,537 A | * | 3/1976 | Abraham | B05B 3/06 |
| | | | | 118/316 |
| 4,143,669 A | * | 3/1979 | Minkin | 134/153 |
| 4,169,299 A | * | 10/1979 | Bandoh | 15/312.1 |
| 4,941,491 A | * | 7/1990 | Goerss et al. | 134/111 |
| 5,224,503 A | * | 7/1993 | Thompson et al. | 134/95.2 |
| 5,249,947 A | * | 10/1993 | Inaba et al. | 425/150 |
| 5,482,066 A | * | 1/1996 | Krueger | 134/111 |
| 5,492,137 A | * | 2/1996 | Giblin et al. | 134/60 |
| 5,738,128 A | * | 4/1998 | Thompson et al. | 134/95.2 |

(Continued)

FOREIGN PATENT DOCUMENTS

| | | | | |
|---|---|---|---|---|
| DE | 600 07 123 | | 9/2004 | ............. B29C 33/72 |
| DE | 102008004773 A1 | * | 7/2009 | |

(Continued)

OTHER PUBLICATIONS

Machine translation of DE 102008004773 A1, dated Jul. 2009.*

(Continued)

*Primary Examiner* — Joseph L Perrin
*Assistant Examiner* — Kevin G Lee
(74) *Attorney, Agent, or Firm* — Hayes Soloway P.C.

(57) ABSTRACT

Disclosed is a magazine device for storing a large number of blow moulds outside a working mode of the blow moulds, which blow moulds serve for transforming plastic preforms into plastic containers and which are in each case composed of multiple parts. The magazine device includes at least one cleaning device for cleaning at least one region of the blow moulds.

19 Claims, 7 Drawing Sheets

(56) References Cited

U.S. PATENT DOCUMENTS

| | | | | |
|---|---|---|---|---|
| 5,791,852 A * | 8/1998 | Bibby et al. | | 414/278 |
| 5,809,740 A * | 9/1998 | Sundby | | B65B 55/08 53/167 |
| 5,972,127 A * | 10/1999 | Thompson et al. | | 134/33 |
| 6,286,523 B1 * | 9/2001 | Wilson et al. | | 134/80 |
| 6,505,636 B1 * | 1/2003 | Travis | | 134/179 |
| 6,797,076 B1 * | 9/2004 | Bryer | | 134/33 |
| 6,904,920 B2 * | 6/2005 | Bexten et al. | | 134/95.3 |
| 7,402,272 B2 * | 7/2008 | Kalemba | | B29C 33/58 264/299 |
| 7,819,650 B2 * | 10/2010 | Meskendahl | | A22C 7/0038 425/220 |
| 8,197,245 B2 * | 6/2012 | Dordoni | | 425/524 |
| 2004/0056374 A1 * | 3/2004 | Brown et al. | | 264/40.5 |
| 2005/0224103 A1 * | 10/2005 | Dolechek et al. | | 134/148 |
| 2005/0268944 A1 * | 12/2005 | Bexten et al. | | 134/22.1 |
| 2009/0178264 A1 | 7/2009 | Stoiber | | 29/401.1 |
| 2011/0052744 A1 | 3/2011 | Meinzinger et al. | | 425/183 |

FOREIGN PATENT DOCUMENTS

| | | | | |
|---|---|---|---|---|
| DE | 102009039700 | 10/2011 | | B65G 1/12 |
| EP | 0 572 107 | 12/1993 | | B67C 7/00 |
| EP | 578058 A2 * | 1/1994 | | |
| EP | 922514 B1 * | 9/2001 | | |
| EP | 1 186 399 | 3/2002 | | B29C 69/00 |
| EP | 2030759 | 3/2009 | | B29C 49/42 |
| FR | 2711629 | 5/1995 | | B65G 1/10 |
| JP | S59-083607 | 5/1984 | | B29C 1/00 |
| JP | S 60250915 | 12/1985 | | B29C 33/72 |
| JP | H04-298308 | 10/1992 | | B29C 33/70 |
| JP | 2004018239 | 1/2004 | | B29C 33/72 |
| WO | WO2009/018952 | 2/2009 | | B29C 49/42 |

OTHER PUBLICATIONS

Machine translation of JP2004018239A, dated Jan. 2004.*
Machine translation of EP578058A2, dated Jan. 1994.*
German Search Report issued in Application No. 10175116.2-2307 dated Sep. 14, 2011 (8 pgs).
Chinese Office Action issued in corresponding application No. 2010102868896, dated Jul. 31, 2012 (13 pgs).
German Official Action dated Aug. 1, 2010, Appln No. 10 2009 040 978.5 (4 pgs).
European Search Report issued in Application No. 10 175 116.2 - 2307 dated Sep. 11, 2013 (8 pgs).
European Search Report issued in Application No. 10 175 116.2 - 1706 dated Feb. 27, 2014 (5 pgs).
Japanese Office Action English Translation, Aug. 2, 2014, Patent Appln No. 2010-199684, (3 pgs).
English translation of Japanese Notification of Reasons for Refusal issued in corresponding Japanese Patent Appln. No. 2010-199684 dated Jun. 9,2015 (4 pgs).

* cited by examiner

MAGAZINE DEVICE FOR BLOW MOULDS, COMPRISING A CLEANING DEVICE

BACKGROUND OF THE INVENTION

The present invention relates to a magazine device for storing blow moulds. Such blow moulds are used in the prior art to transform plastic preforms into plastic containers, in particular PET bottles, usually in the context of a blow moulding process. It is sometimes necessary to exchange these blow moulds for example if other bottle formats are to be blow-moulded. The blow moulds not in use are usually stored in magazines, wherein to this end the blow moulds are broken down into their individual parts, such as for example two side parts and a bottom part, and are accommodated in an appropriate holding container. The so-called stretching rods can likewise be placed in these holding containers. In the broader sense, the stretching rods also form part of the blow moulds and will not be mentioned separately in the rest of the description. Further components which are necessary for transforming plastic preforms into plastic containers, such as gripping elements for example, can also be accommodated in addition.

WO 2009/018952 A2 discloses such a blow moulding machine for containers. This comprises a conveyor path carrying mandrel holders and preform mandrels which are attached in an exchangeable manner to the mandrel holders by means of releasable couplings, wherein each coupling comprises a mandrel clamping mechanism and a release element which is accessible from outside and which is adjustable at least relative to the mandrel holder.

EP 0 572 107 B1 discloses a work head changer for a rotary system for treating containers.

A magazine device for blow moulds is known from the applicant's German patent application No. 10 2009 039 700.0, which has not yet been published. The subject matter of said patent application is also fully incorporated by way of reference into the subject matter of the present patent application.

The object of the present invention is in particular to reduce changeover times for blow moulds and also to simplify such a blow mould changeover.

SUMMARY OF THE INVENTION

A magazine device according to the invention for storing a large number of blow moulds outside a working mode of the blow moulds, wherein the blow moulds serve for transforming plastic preforms into plastic containers and are in each case composed of multiple parts, comprises according to the invention a cleaning device for cleaning at least one region of the blow moulds.

In the prior art, usually the blow moulds are removed in individual parts, then are manually cleaned in individual parts by the user and finally are deposited in cleaned condition in a magazine. According to the invention, therefore, it is proposed to provide a magazine device which serves for storing these blow moulds, wherein a cleaning device for cleaning the blow moulds is integrated directly in this magazine device. In this way, a cleaning process can be carried out directly in a magazine device, as a result of which the handling of the blow moulds is simplified for the user.

Advantageously, the magazine device comprises a large number of holding means for holding the individual blow moulds separately from one another, wherein advantageously the holding means are designed in such a way that the blow moulds can be held individually by said holding means.

In a further advantageous embodiment, the cleaning device is also suitable for cleaning further elements of a blow moulding station for transforming plastic preforms into plastic containers, such as stretching rods for example.

Preferably, the holding means are holding means which are in engagement with at least one region of the blow moulds in order thus to allow a secure holding of the blow moulds.

Preferably, the blow moulds are held by the holding means in an at least partially assembled state.

While in the prior art, as mentioned above, the blow moulds are deposited in individual parts in magazines, it is therefore advantageously proposed here to arrange the blow moulds in an at least partially assembled state in the magazine on or in appropriate holding means. These holding means may be either holding means in the narrower sense, which grip the blow moulds, or for example storage compartments or holding pockets which are in each case suitable for separately holding the blow moulds.

Partially assembled is understood to mean that a predefined geometric relationship exists between the individual parts of the blow moulds. For example, the side parts of the blow mould may be arranged next to one another and preferably also a bottom part may be suspended in this blow mould. By virtue of the magazine according to the invention, the individual parts need not first be collected together when the blow mould is to be reused, but rather the blow mould is already in a ready-to-install state and can optionally also be installed automatically in the machine.

In particular, the blow moulds are in this case stored in an isolated form, that is to say in a state unfit for work and in particular without a mould carrier. As mentioned, the blow mould in its entirety may be accommodated in a holding means or else the components of the blow mould may be arranged in different holding means.

Advantageously, the magazine device is designed in such a way that the blow moulds are at a closer spacing than in the case of a blow moulding machine on which they are arranged in the normal working mode.

Usually, the blow moulds are arranged in the holding means or on the holding means in a fully assembled manner, i.e. with side parts and bottom parts. In this case, holding means may be provided which can be used to hold the side parts and the bottom separately.

Advantageously, the holding means are adapted to holding means of an apparatus for transforming plastic preforms into plastic containers, in which the blow moulds are located in a working mode of this apparatus. In this case it is possible that the blow moulds are removed in a still-assembled state from the apparatus for transforming plastic preforms into plastic containers, this likewise being unknown to date in the prior art. The holding means of the magazine device and of the blow moulding machine could thus be of identical design and could thus be connected to the blow moulds for example in an identical manner. However, it would also be possible that the holding means of the magazine device are merely adapted to the holding means of the magazine device in such a way that the same blow moulds can be held or received both by the holding means of the blow moulding machine and by the holding means of the magazine device.

For example, the receiving means may be designed in the same way as similar holding means on which the blow moulds are arranged in the working mode. However, it would also be possible that the adaptation is such that it merely ensures that the blow moulds can be accommodated without additional adapter elements in the magazine device, that is to say for example gripping elements or the like are provided.

However, an adapter piece could also be deliberately provided, which is inserted onto or into the blow moulds when the latter are removed and on which the blow moulds are arranged on the holding means.

In a further advantageous embodiment, the magazine device comprises a transport device for transporting the blow moulds. The transport device advantageously transports the blow moulds individually. In a further advantageous embodiment, the transport device transports the blow moulds in a lying-down position or such that the longitudinal axis thereof runs substantially horizontally. The transport device advantageously transports the blow moulds along a closed path.

In a further advantageous embodiment, the cleaning device comprises a first cleaning element which cleans the blow moulds in a first predefined manner. A cleaning of the blow moulds is understood to mean any process which increases a degree of cleanliness of the blow moulds, such as for example rinsing, wiping, polishing, disinfecting, sterilising and the like.

Advantageously, the cleaning element is arranged in a stationary manner relative to a movement direction of the blow moulds. This means that the blow moulds are moved by the transport device in a given movement direction for example on a circular path or on an oval path and the cleaning element is arranged in a stationary manner along this transport path.

Advantageously, however, the cleaning element is movable in a movement direction which differs from the transport direction of the blow moulds. For example, it is possible that the blow moulds are moved along a circular path and the cleaning element is movable perpendicular to this circular path, in order in this way to be able to clean a plurality of rows of blow moulds arranged one above the other.

In addition, it is also possible that at least one cleaning element is movable in a longitudinal direction of the blow moulds. In this way, the cleaning element can be pushed into the interior of the blow mould in order thus to be able to carry out a cleaning process. Advantageously, therefore, at least one cleaning element is movable in two different directions and particularly preferably in two directions which are substantially perpendicular to one another.

In a further advantageous embodiment, the magazine device comprises a housing which substantially completely isolates the blow moulds from the surrounding environment. In this embodiment, the magazine device is also suitable for sterilising the blow mould and/or for treating the blow mould under aseptic conditions. It is possible in this case that the cleaning element is integrated for example in a wall of the housing and is moved jointly with this wall, so that the wall itself remains airtight and therefore no unsterile air can penetrate into the housing.

In a further advantageous embodiment, the transport device transports the blow moulds in cycles. It is thus possible that a given blow mould can be transported successively for example from a first cleaning element to a second cleaning element and from this second cleaning element to a third cleaning element.

In a further advantageous embodiment, the magazine device comprises a second cleaning element which cleans the blow moulds. It is thus possible that the blow moulds are cleaned differently in two or more successive steps, for example are acted upon by water in a first cleaning step, are acted upon by a brush in a second cleaning step, rinsing until the water runs clear takes place in a further step, the blow moulds are dried using air or sterile air in a further step, and finally a disinfection or sterilisation is carried out.

In a further advantageous embodiment, this second cleaning element is arranged behind the first cleaning element along the transport path of the blow mould in order in this way, as mentioned, to carry out a successive cleaning of the blow moulds.

In a further advantageous embodiment, the cleaning device comprises a sterilising unit for sterilising the blow moulds. This embodiment is suitable in particular for aseptic applications or for those applications in which the blow moulds must be cleaned under sterile conditions. Preferably, the sterilising device applies a cleaning medium such as hydrogen peroxide or peracetic acid for example to the blow moulds. However, it would also be possible that the sterilising device emits beams such as for example UV light or electron beams onto the blow moulds.

Advantageously, at least one cleaning element is designed in such a way that it treats an inner wall of the blow moulds. For example, it is possible that the cleaning device in the form of a spray head is inserted through a neck opening of the blow mould into the interior thereof in order thus to wet the inner wall of the blow moulds. A brush head could also be inserted into the interior of the blow mould. However, it would also be possible that, for this purpose, the bottom part of the blow moulds is introduced separately from the blow moulds in the magazine device, so that a cleaning of the bottom part and a cleaning of the two side parts and in each case of the inner walls thereof can be carried out separately. However, it would also be possible that the blow mould is held in the magazine device in such a way that it forms a closed cavity, in order in this way to be able to be acted upon by the cleaning agent.

The present invention also relates to a method for storing blow moulds which serve for transforming plastic preforms into plastic containers.

In this case, the blow moulds are removed from the apparatus for transforming plastic preforms into plastic containers and are arranged in the magazine device, wherein the blow moulds are at least partially cleaned in the magazine device.

Preferably, the blow moulds are transported in the magazine device by means of a transport device. With particular preference, the blow moulds are transported in cycles in the magazine device. Furthermore, a cleaning of the blow moulds is preferably carried out inside the device in a plurality of cleaning steps. Preferably, the blow moulds are cleaned in an at least partially automated manner, and with particular preference the cleaning takes place while the blow moulds are in a stored state in the magazine device.

In a further preferred method, this cleaning process is carried out automatically.

BRIEF DESCRIPTION OF THE DRAWINGS

Further advantages and embodiments will emerge from the appended drawings.

In the drawings.

DETAILED DESCRIPTION OF THE DRAWINGS

Figure 1A:
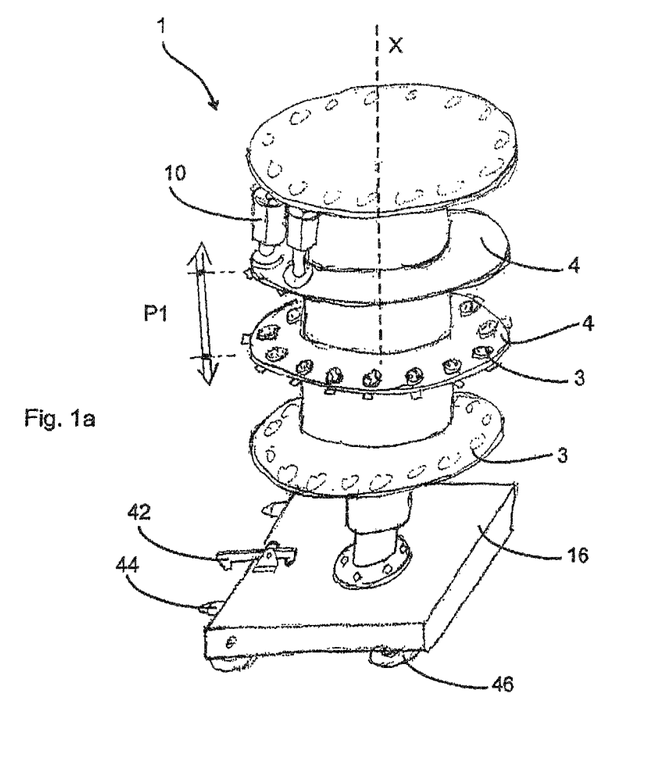
FIGS. 1a-1b show a magazine device according to the invention in a first embodiment.

FIG. 1*a* shows a simplified view of a magazine device 1 according to the invention. Provided in this magazine device are a large number of holding means 3 which are arranged here in each case on a carrier device 4 in the form of a disc or plate. It can be seen that the blow moulds 10 are held in an assembled state in the magazine device 1.

The individual holding means 3 are arranged here on the carrier device 4 in particular in an evenly spaced manner in the circumferential direction. It is also possible that a plurality of carrier devices 4 are provided, which are also displaceable for example jointly or independently from one another, but in particular jointly, in the direction of the arrow P1. In this way, the magazine device can serve to hold several sets of blow moulds 10 or even higher numbers of blow moulds.

Furthermore, the individual carrier devices are rotatable about a common axis of rotation X. The carrier devices 4 and also the individual holding means are therefore arranged such as to be movable relative to a frame 16. Reference 42 denotes a connecting device such as a hook, by means of which the magazine device can be connected for example mechanically to a blow moulding machine.

Reference 44 denotes connections, in particular electrical connections, by which the magazine device 1 can be connected to a blow moulding machine. More specifically, the device shown in FIG. 1*a* is a round magazine which has here a large number of receiving means which are designed in a manner identical to corresponding holding means of an apparatus for transforming plastic preforms into plastic containers.

The pitch of the individual holding means 3 and also of the blow moulds is smaller here than on the blow moulding machine, so that the magazine device advantageously has a diameter which is between 1 m and 3 m, preferably between 1 m and 2 m. During operation, the magazine device 1 preferably has one holding means more than on the associated blow moulding machine, so that the first mould removed from the blow moulding machine can also be placed. As mentioned, the magazine device may be further cycled in terms of pitch with a blow moulding machine carousel. By means of castor devices 46, the magazine device 19 is designed in a movable manner and can be docked onto a blow moulding machine for the automatic removal of the blow moulds.

Figure 1B:
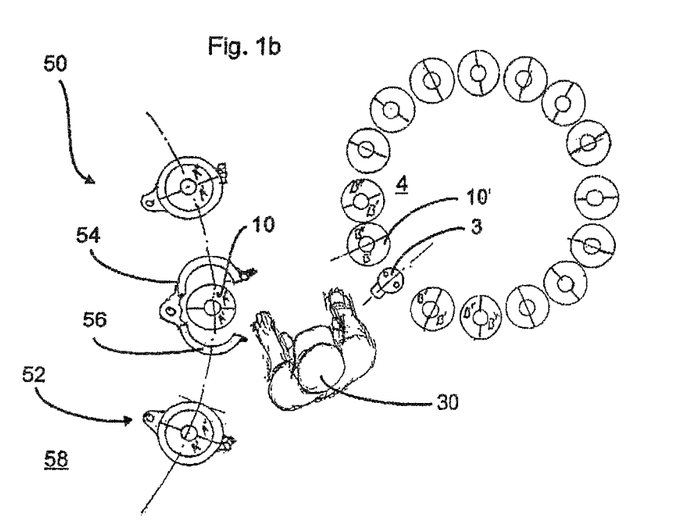

FIG. 1*b* shows a schematic view to illustrate the functioning of the magazine device. An apparatus for transforming plastic preforms into plastic containers, or a blow moulding machine 50, is also provided here, wherein this blow moulding machine 50 comprises a plurality of blow mould carriers 52 which are in each case composed of two side parts 54 and 56. These two side parts 54, 56 accommodate the blow mould 10 between them. In the event of a blow mould changeover, firstly the two side parts 54 and 56 are separated from the blow mould 10 and then the blow mould 10 is removed in an assembled state shown in FIG. 1*b*. This may also take place manually by a user 30, as shown in FIG. 1*b*. This blow mould 10 can then be placed onto the free receiving means 2. In a corresponding manner, a new blow mould 10' can be removed from the magazine device and inserted in the space on the blow moulding machine 50 which is now free. Reference 58 denotes a blow moulding wheel on which a plurality of blow moulding stations or blow mould carriers 52 are arranged.

Figure 1C:
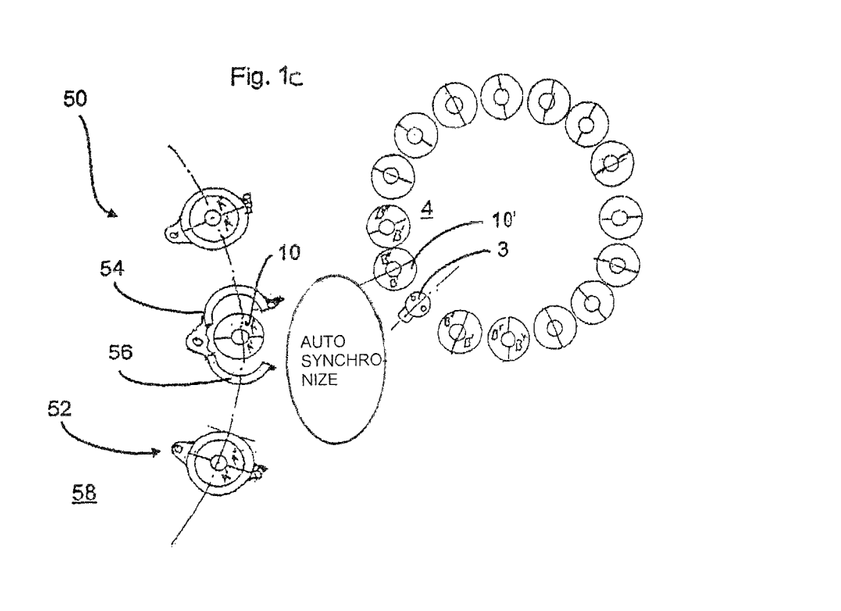
FIG. 1c shows a magazine device automatically synchronized with a blow molding machine according to a second embodiment of the invention.

In one preferred embodiment, as shown in FIG. 1*c*, it is possible to synchronise the magazine device with a corresponding blow moulding machine, so that the removal of the blow mould can take place in a fully automatic manner.

Figure 2:
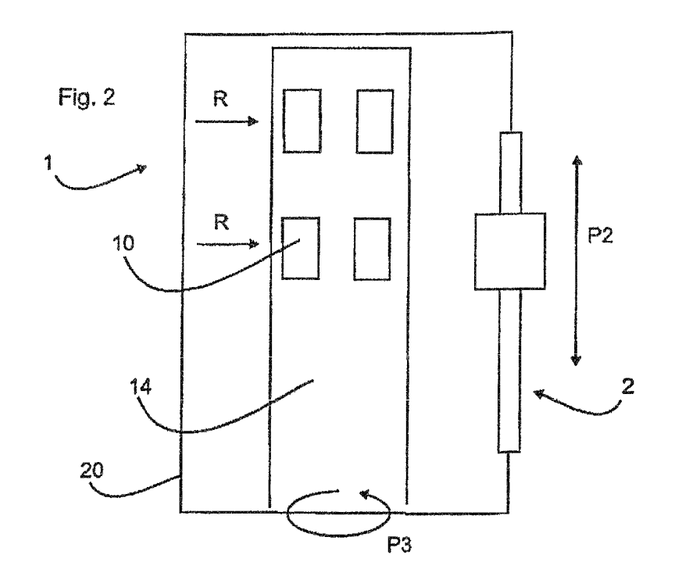
FIG. 2 shows a schematic view of a magazine device according to the invention.

FIG. 2 shows a highly schematic view of a magazine device according to the invention. Here, a carrier 14 which is rotatable (cf. arrow P3) is provided. Reference 20 denotes a housing which completely surrounds here the carrier 14 and the blow moulds 10 arranged therein. Reference 2 denotes in its entirety a cleaning device which serves for cleaning the individual blow moulds 10 or the components thereof. This cleaning device is movable in the direction of the arrow P2, that is to say from top to bottom here, in order to be able to clean a plurality of rows R of blow moulds.

FIG. 3 once again shows a schematic view of a magazine device 1 according to the invention. It can be seen here that the cleaning unit comprises a total of five cleaning elements 22, 24, 25, 26 and 28. These different cleaning elements are arranged here one behind the other along the transport path T of the blow moulds and thus allow different cleaning steps. By way of example, the cleaning element 22 may comprise one or more nozzles which apply water and/or a cleaning agent to the blow moulds 10. The cleaning element 24 may be for example a brush which can be inserted into the interior of the blow mould in order to clean and/or polish the inner wall.

Figure 3:
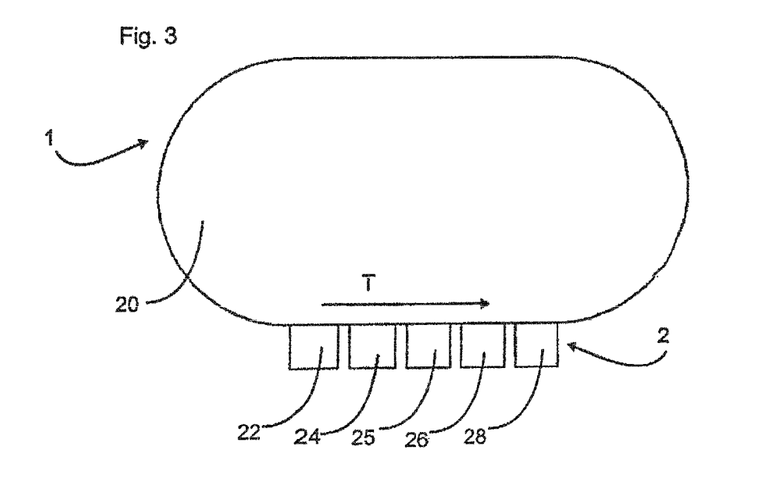
FIG. 3 shows a further schematic view of a magazine device according to the invention.

Reference 25 denotes a further cleaning element which for example once again applies water to the blow moulds in order to rinse the latter. The cleaning element 26 may be for example an air nozzle which applies air and in particular sterile air to the blow mould for drying purposes. Reference 28 denotes a further cleaning element which may serve for example for disinfecting and/or for sterilising the blow moulds.

In the case of aseptic applications via a sterile air supply, for example, the situation may be achieved inside the housing 20 (FIG. 1) that a higher pressure prevails in the interior of the housing than outside the housing. In this way, decontaminants from outside can be permanently prevented from entering the housing. In this way, blow moulds can also be stored under aseptic conditions over a relatively long period of time. Advantageously, therefore, the housing 20 is substantially closed off with respect to the surrounding environment and particularly preferably has a supply for air and in particular sterile air in order to keep the interior of the housing at a higher pressure than the surrounding environment.

Figure 4:
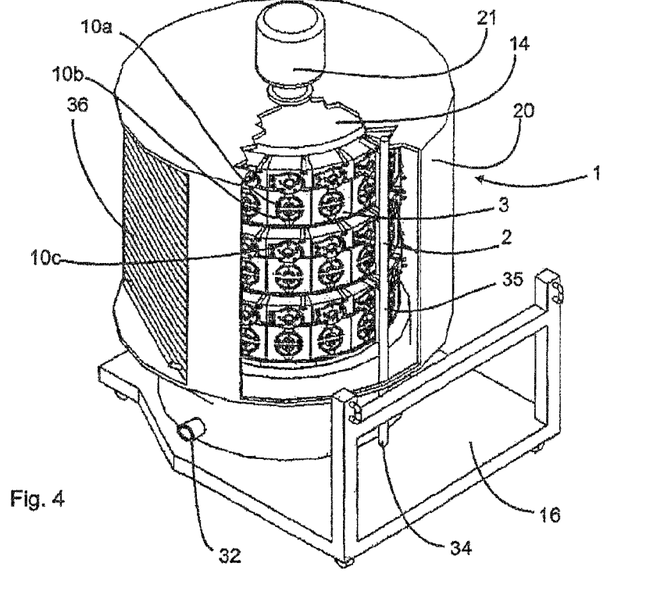
FIG. 4 shows a perspective view of a magazine device according to the invention in a first embodiment.

FIG. 4 shows a more detailed view of a magazine device 1 according to the invention. It is possible to see here a drive device 21 or a motor which can rotate the carrier 14 on which the individual holding means 3 for the blow moulds are arranged. Reference 2 once again denotes the cleaning device which serves for cleaning the individual blow moulds. Reference 36 denotes an outer wall of the housing or of the device, which separates the individual blow moulds from the surrounding environment. References 10*a* and 10*b* denote the two side parts of the blow moulds 10 and reference 10*c* denotes the bottom part. Both the bottom part and the side parts are arranged in such a way that openings therein face outwards so that a cleaning agent can be applied thereto. Reference 32 denotes a drainage opening via which cleaning media used for cleaning the blow moulds can be drained off. Reference 34 denotes a connection for cleaning agent, i.e. a cleaning medium can be supplied to the individual blow moulds via this connection and via a pipeline 35 adjoining said connection. Reference 16 once again denotes a frame of the device as a whole.

Figure 5:
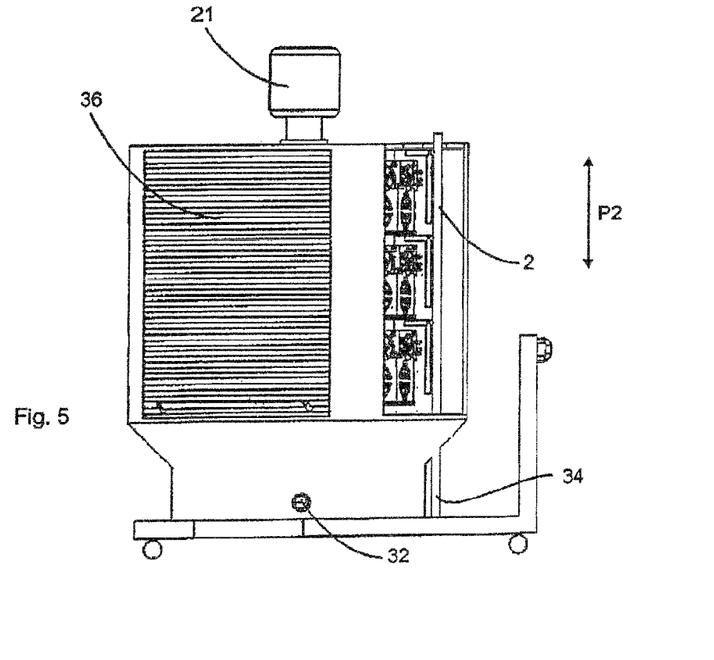
FIG. 5 shows a side view of the magazine device of FIG. 4.

FIG. 5 shows a side view of the device shown in FIG. 4. It is possible to see here once again the side wall, which is designed here in the manner of a shutter and can therefore be pushed upwards or downwards for example in order to allow access to the individual blow moulds. In this way, the individual blow moulds 10 can be removed from the magazine device and installed for example in a blow moulding machine. However, it would also be possible that this process is automated and the blow moulds are automatically transferred to the magazine device. Here, the individual blow moulds 10 are advantageously arranged horizontally in the magazine device, in order in this way to simplify the cleaning process. However, it would also be possible that the blow moulds are arranged vertically and for example a cleaning agent is applied thereto from below.

Figure 6:
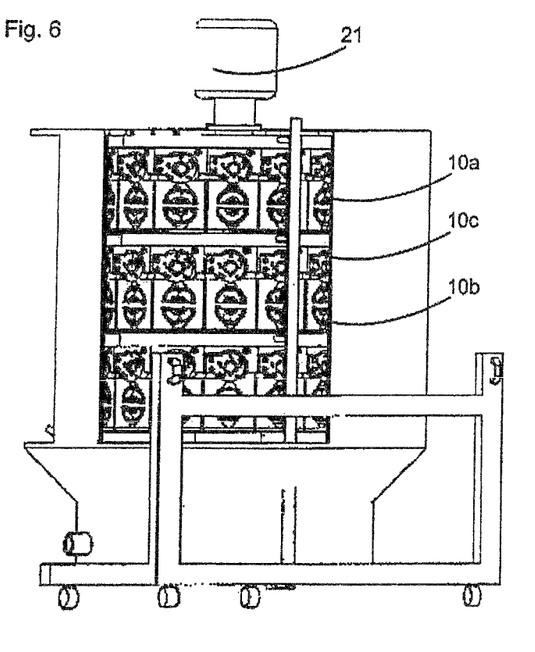
FIG. 6 shows a further side view of the magazine device of FIG. 4.

FIG. 6 shows a further view of the magazine device according to the invention. Here too, it is possible to see once again that the blow moulds are arranged one above the other in individual holding means, wherein the two side parts of the blow mould 10a and 10b are in each case placed next to one another and the bottom part 10c is arranged thereabove. The arrangement shown in FIG. 6 allows a large number of blow moulds to be accommodated in a very space-saving manner.

Figure 7:
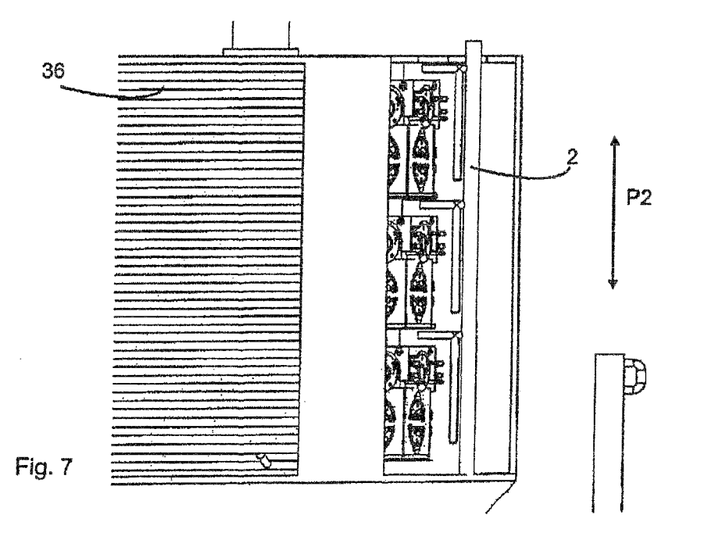
FIG. 7 shows a view of part of the magazine device of FIG. 4.

FIG. 7 shows a further detail view of the magazine device 1 shown in FIG. 5. It is also possible to see here once again the cleaning device 2 which serves for cleaning the individual blow mould parts. As mentioned above, the cleaning device 2 is preferably movable in the direction of the arrow P2. However, it would also be possible that a plurality of cleaning elements are arranged one above the other in the direction P2, so that a separate, successive or simultaneous cleaning of the individual blow mould parts is possible. However, it would also be conceivable that the components of the blow mould are arranged next to one another in the holding means.

Figure 8:
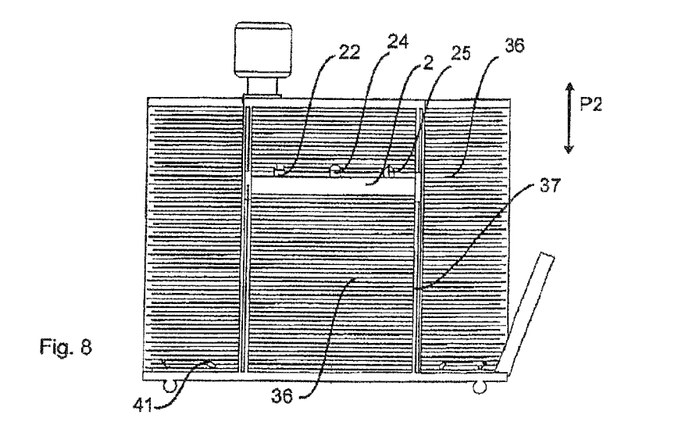
FIG. 8 shows a further embodiment of a magazine device according to the invention.

FIG. 8 shows a further embodiment of a magazine device according to the invention. While in the case of the magazine device illustrated in the above embodiment the blow moulds are conveyed along a circular path, in the embodiment now shown the blow moulds are conveyed along an oval path, for example with the aid of a transport chain.

For this purpose, there may be provided two deflecting wheels and a chain arranged between these wheels, so that the blow moulds are conveyed at least partially also along a rectilinear path. Reference 2 also once again denotes in its entirety the cleaning device, on which three cleaning elements 22, 24, 25 are arranged here. Here too, the cleaning device is movable in the direction of the arrow P2, i.e. upwards and downwards.

A drive (not shown) is preferably provided, which brings about this movement of the cleaning device in the direction of the arrow P2. For example, it would be possible that a rotary spindle is provided, which produces the movement of the cleaning device. The cleaning device is integrated here in a wall 36 and this wall 36 preferably moves along with as a movement of the cleaning device 2. In this way, the wall can be permanently substantially airtight and can nevertheless allow a movement of the cleaning device in the direction of the arrow P2. Reference 37 denotes rail-type guides for guiding the cleaning device 2.

Reference 41 denotes handle elements for opening the individual wall sections 36 in order thus to be able to remove or insert the blow moulds.

Figure 9:
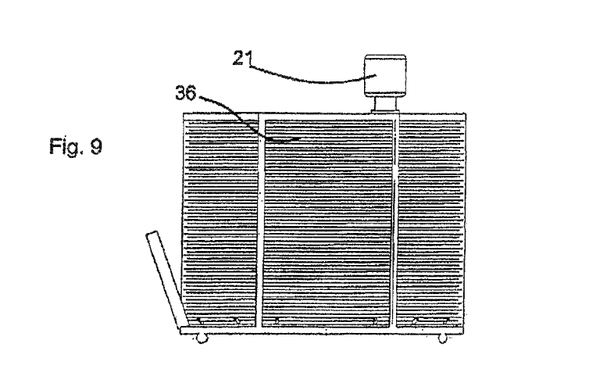
FIG. 9 shows a further view of the magazine device of FIG. 8.

FIG. 9 shows a rear side of the magazine device shown in FIG. 8. Here too, the wall sections or walls 36 can once again be seen, which are nevertheless movable for the purpose of opening and closing.

Figure 10:
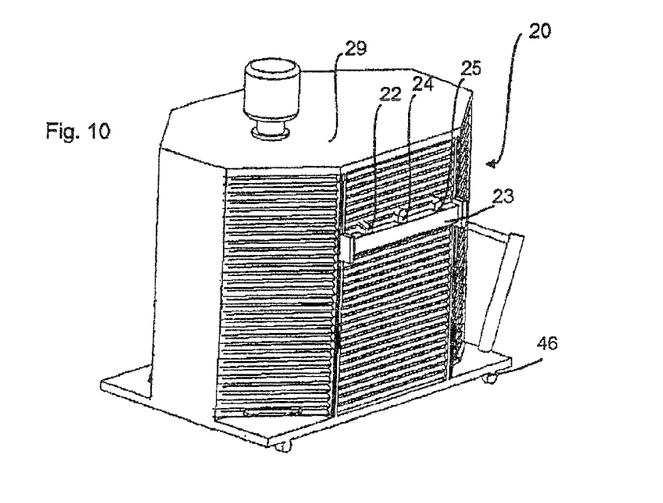
FIG. 10 shows a further view of the magazine device of FIG. 8.

FIG. 10 shows a perspective view of the magazine device shown in FIG. 8. It is possible to see here a crossbar 23, on which the cleaning elements 22, 24, 25 are fixedly arranged. Reference 29 denotes a lid or cover, by means of which the housing, denoted as whole by 20, can be closed.

Figure 11:
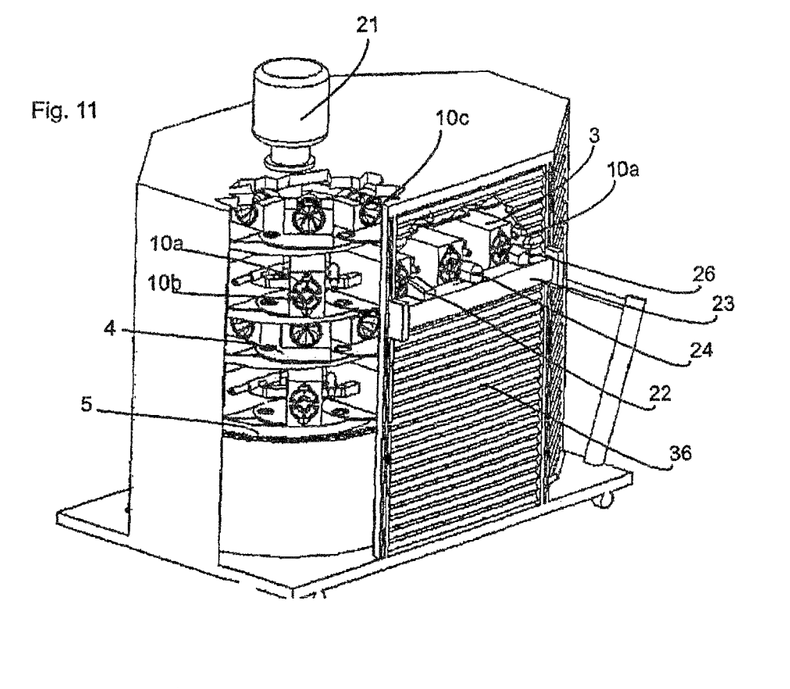
FIG. 11 shows a perspective and partially opened view of the magazine device of FIG. 8.

FIG. 11 provides a view into the interior of the magazine device shown in FIG. 8. It is once again possible to see here the individual blow mould parts 10a, 10b and 10c, which are arranged separately from one another on holding means. Reference 5 denotes a carrier on which the individual holding means are arranged. The drive device 21 serves for moving the blow moulds. Once again, the three cleaning elements 22, 24 and 26 are arranged on the crossbar 23 and it is also possible to see once again the holding means 3 which serve for holding in this case the blow mould side parts 10a and 10b. As mentioned above, when this crossbar 23 moves, the wall 36 also moves therewith, so that it remains substantially closed even during the cleaning process.

Figure 12:
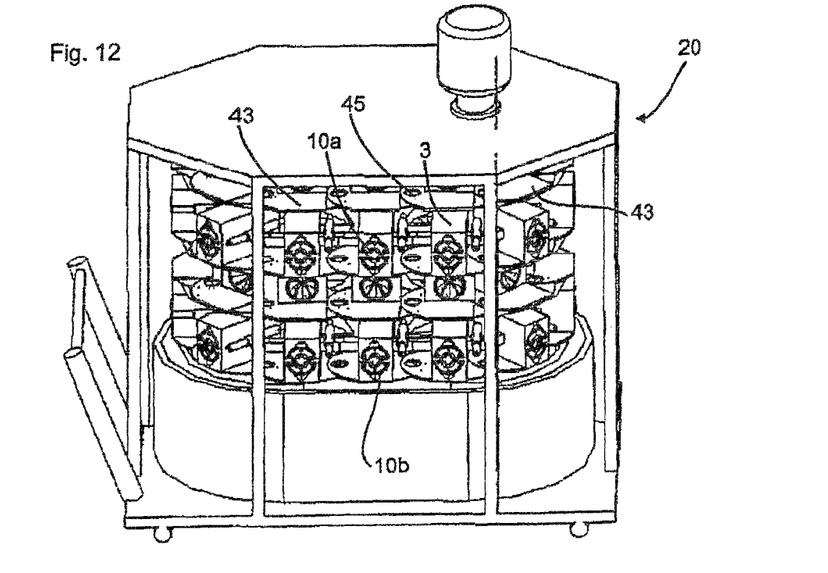
FIG. 12 shows a further view of the magazine device of FIG. 8.

FIG. 12 shows a further view of the device shown in FIG. 8, in an open state. It is possible to see here individual chain links 43 which are connected to one another via articulated connections 45 and on which in each case the holding means 3 are arranged here. These chain links serve for transporting the blow moulds inside the housing 20.

Figure 13:
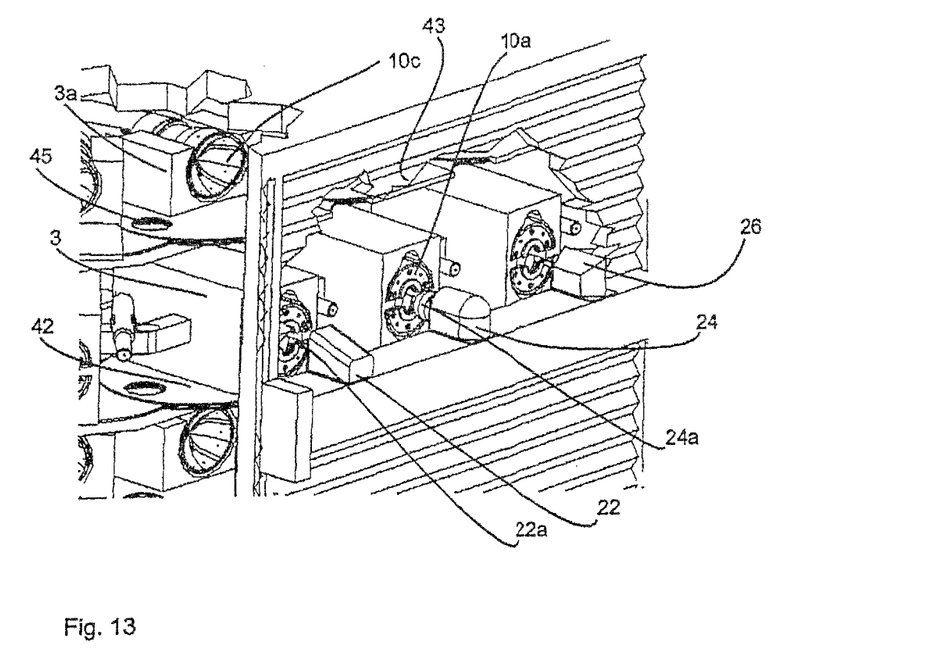
FIG. 13 shows a detail view of the magazine device of FIG. 8.

FIG. 13 shows a more detailed view of the device shown in FIG. 8. In this case, the cleaning element 22 comprises for example a nozzle 22a which enters the interior of the blow moulds 10 and applies a cleaning agent to the inner wall. Said nozzle may be for example a plastic cleaning nozzle with a rotary head which rotates as the cleaning agent is dispensed and thus allows a 360° spraying of the inner wall of the blow mould. The cleaning element 24 comprises here a brush element 24a which can likewise be inserted into the interior of the blow mould parts. Reference 26 may once again comprise for example a cleaning nozzle which applies a cleaning agent or also a sterilising agent to the inner wall of the blow mould. Reference 3a denotes here a holding means which serves here in particular for holding the bottom parts 10c of the blow mould.

All of the features disclosed in the application documents are claimed as essential to the invention in so far as they are novel individually or in combination with respect to the prior art.

LIST OF REFERENCES 1 magazine device
2 cleaning device
3 holding means, receiving means
4, 14 carrier device
5 carrier
8 drive device
10, 10' blow mould
10a, 10b side parts of the blow mould
10c bottom part of the blow mould
12 holding means in the form of holding pockets
16 frame
20 housing
21 drive device
22 first cleaning element 22a nozzle
23 crossbar
24 second cleaning element
24a brush element
25, 26, 28 cleaning elements
29 lid
30 user
32 drainage opening
34 connection
35 pipeline
36 outer wall of the housing
37 rail-type guide
41 handle elements
42 connecting device
43 chain links
44 connections
45 connecting devices, articulated connections
46 castor devices
50 blow moulding machine, apparatus for transforming plastic preforms
52 blow mould carrier
54, 56 side parts
58 blow moulding wheel
B movement direction
P1, P2, P3 arrows
R rows
T transport path

The invention claimed is:

1. A blow moulding system comprising, in combination:
   a blow moulding machine having a first plurality of holding devices for holding individual blow moulds, and
   a magazine device for storing and cleaning blow moulds in at least a partially assembled state outside a working mode of the blow moulding machine,
   wherein the blow moulds serve for transforming plastic preforms into plastic containers and which are in each case composed of multiple parts,
   wherein the magazine device comprises a second plurality of holding devices arranged on a carrier device in an evenly-spaced manner holding the individual blow moulds separately from one another,
   wherein the first and the second plurality of holding devices are in engagement with at least one region of the blow moulds, and
   wherein an at least one cleaning device for cleaning at least one interior region of the blow moulds is incorporated into the magazine device, and said magazine device includes a housing substantially completely isolating the blow moulds and the cleaning device, and said cleaning device is integrated into a side wall of the housing,
   wherein both a bottom part and side parts of the housing are arranged such that openings therein face outwards so that a cleaning agent can be applied thereto, and
   wherein the magazine device is synchronized with the blow moulding machine, so that a removal of the blow mould can take place in a fully automatic manner from the magazine device to the blow moulding machine, and vice versa.

2. The blow moulding system according to claim 1, wherein the first and second pluralities of holding devices are designed such that the blow moulds are received individually by said first and second pluralities of holding devices.

3. The blow moulding system according to claim 1, wherein the magazine device comprises a transport device for transporting the blow moulds.

4. The blow moulding system according to claim 1, wherein the first and second pluralities of holding devices are adapted to holding devices of an apparatus for transforming plastic preforms into plastic containers, in which the blow moulds are located in a working mode of the system.

5. The blow moulding system according to claim 1, wherein the cleaning device comprises a first cleaning element which cleans the blow moulds in a first predefined manner.

6. The blow moulding system according to claim 5, wherein the cleaning element is arranged in a stationary manner relative to a movement direction of the blow moulds.

7. The blow moulding system according to claim 5, wherein the cleaning element is movable in a movement direction which differs from a transport direction of the blow moulds.

8. The blow moulding system according to claim 1, wherein the magazine device comprises a housing which isolates the blow moulds from the surrounding environment.

9. The blow moulding system according to claim 3, wherein the transport device transports the blow moulds in a given movement direction on a circular path or on an oval path.

10. The blow moulding system according to claim 5, wherein the magazine device comprises a second cleaning element which cleans the blow mould.

11. The blow moulding system according to claim 10, wherein the second cleaning element is arranged behind the first cleaning element along a transport path of the blow moulds.

12. The blow moulding system according to claim 1, wherein the cleaning device comprises a sterilising unit for sterilising the blow moulds.

13. The blow moulding system according to claim 10, wherein the at least one cleaning element is designed such that it treats an inner wall of the blow moulds.

14. The blow moulding system according to claim 13, wherein the cleaning element comprises a nozzle which enters the interior of the blow moulds and applies a cleaning agent to the inner wall.

15. The blow moulding system according to claim 14, wherein the nozzle is a plastic cleaning nozzle with a rotary head which rotates as the cleaning agent is dispensed, whereby to allow a 360° spraying of the inner wall of the blow mould.

16. The blow moulding system according to claim 1, wherein the blow moulds are held by the first and second pluralities of holding devices in an at least partially assembled state.

17. The blow moulding system of claim 1, wherein the cleaning element comprises a brush element which is insertable into an interior of the blow mould parts.

18. A blow moulding system comprising, in combination:
   a blow moulding machine having a first plurality of holding devices for holding individual blow moulds, and
   a magazine device for storing and cleaning blow moulds in at least a partially assembled state outside a working mode of the blow moulding machine and,
   wherein the blow moulds serve for transforming plastic preforms into plastic containers and which are in each case composed of multiple parts,
   wherein the magazine device comprises a second plurality of holding devices arranged on a carrier device in an evenly-spaced manner holding the individual blow moulds separately from one another,
   wherein the first and the second plurality of holding devices are in engagement with at least one region of the blow moulds, and wherein an at least one cleaning device for cleaning at least one interior region of the blow moulds is incorporated into the magazine device, and said magazine device includes a housing substantially completely isolating the blow moulds and the cleaning device, and said cleaning device is integrated into a side wall of the housing, wherein an outer wall of the housing moves along with movement of the cleaning device, such that said outer wall is substantially airtight and can nevertheless allow a movement of the cleaning device in a vertical direction, and wherein the magazine device is synchronized with the blow moulding machine, so that a removal of the blow mould can take place in a fully automatic manner from the magazine device to the blow moulding machine, and vice versa.

19. A blow moulding system comprising, in combination:

a blow moulding machine having a first plurality of holding devices for holding individual blow moulds, and a magazine device for storing and cleaning blow moulds in at least a partially assembled state outside a working mode of the blow moulding machine and, wherein the blow moulds serve for transforming plastic preforms into plastic containers and which are in each case composed of multiple parts, wherein the magazine device comprises a second plurality of holding devices arranged on a carrier device in an evenly-spaced manner holding the individual blow moulds separately from one another, wherein the first and the second plurality of holding devices are in engagement with at least one region of the blow moulds, and wherein an at least one cleaning device for cleaning at least one interior region of the blow moulds is incorporated into the magazine device, and said magazine device includes a housing substantially completely isolating the blow moulds and the cleaning device, and said cleaning device is integrated into a side wall of the housing, wherein the magazine device includes a cross-bar upon which the first and second cleaning elements are fixedly arranged, and wherein the crossbar is moveable with a wall of the magazine device, so that the magazine device remains substantially closed during the cleaning process, and wherein the magazine device is synchronized with the blow moulding machine, so that a removal of the blow mould can take place in a fully automatic manner from the magazine device to the blow moulding machine, and vice versa.

* * * * *